United States Patent [19]

Larsen

[11] 4,363,423
[45] Dec. 14, 1982

[54] DIAPHRAGM DISPENSER

[75] Inventor: Richard R. Larsen, Daytona Beach, Fla.

[73] Assignee: Pacific Scientific Company, Anaheim, Calif.

[21] Appl. No.: 225,923

[22] Filed: Jan. 19, 1981

Related U.S. Application Data

[63] Continuation of Ser. No. 45,537, Jun. 1, 1979, abandoned.

[51] Int. Cl.³ .............................................. B65G 59/10
[52] U.S. Cl. ...................................... 221/82; 221/277; 221/312 A; 221/4; 198/676
[58] Field of Search ............... 221/258, 277, 290, 289, 221/312 A, 4, 75, 79–82; 198/657, 676

[56] References Cited

U.S. PATENT DOCUMENTS 2,520,481  8/1950  Tuerff ............................ 221/277 X
3,464,588  9/1969  Strik et al. ............................ 221/75

Primary Examiner—Allen N. Knowles
Attorney, Agent, or Firm—James A. Hudak

[57] ABSTRACT

A device that can individually separate thin nested metallic diaphragms prior to welding same to form bellows is disclosed. The device uses a threaded rod (16) which is tilted upwardly with respect to the horizontal. One end of threaded rod (16) is received through the inside diameter of a stack (32) of nested diaphragms while the other end thereof is received in a collet (18) attached to a gear motor (20). As threaded rod (16) is rotated by gear motor (20), each diaphragm (10) is carried in its own groove provided by the threads on the threaded rod (16) to the free end thereof where one diaphragm is discharged for each revolution of the threaded rod (16).

3 Claims, 7 Drawing Figures

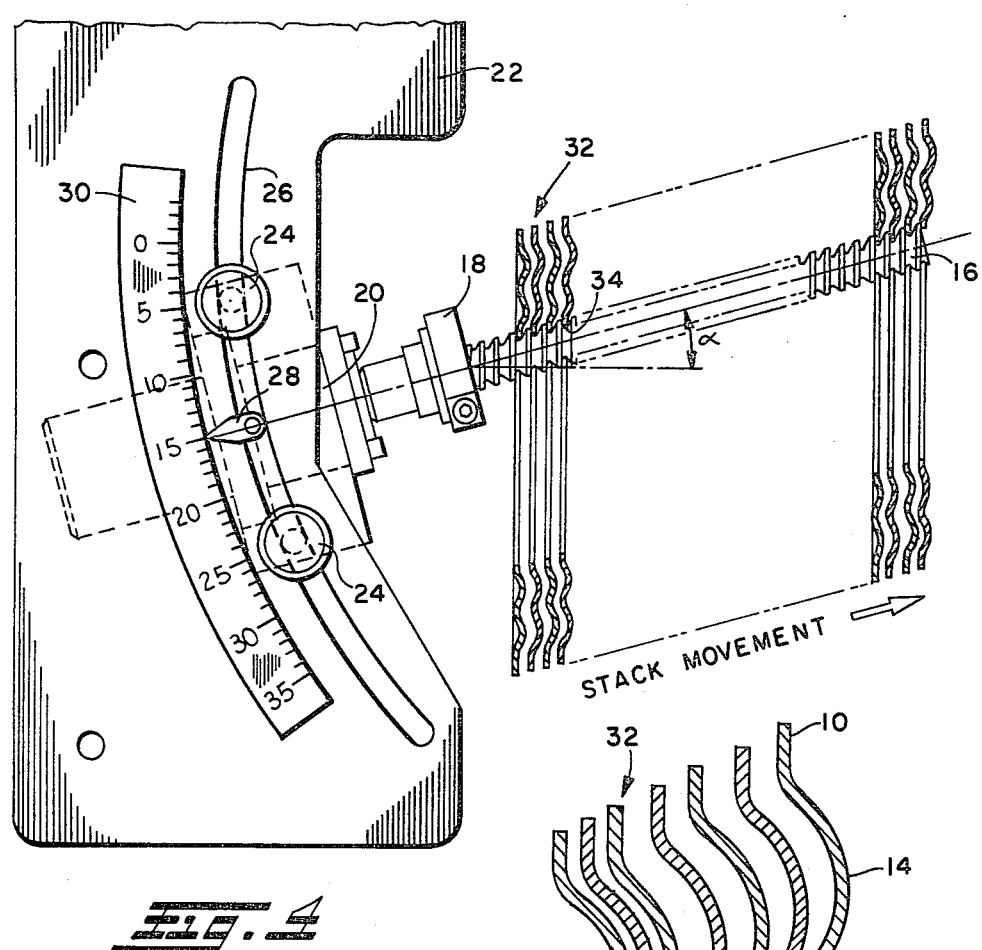
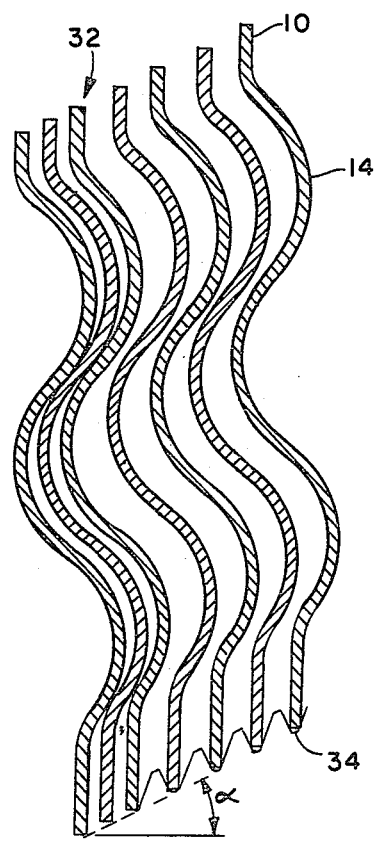

DIAPHRAGM DISPENSER

This is a continuation, of application Ser. No. 45,537, filed 06011979, now abandoned.

TECHNICAL FIELD

This invention generally relates to a device for separating thin disc-like objects which are nested together, and more particularly to a rotatable threaded device which separates thin metallic diaphragms prior to welding same to form bellows.

BACKGROUND ART

Metallic bellows are used in many applications such as flexible joints, torque couplings, rod seals, and pressure sensors. Typically, these metallic bellows are formed from thin metallic diaphragms which are stacked in the desired configuration and then welded together. The diaphragms usually are formed from thin gage strip or sheet metal stock and have a configuration which lends itself to nesting resulting in a number of benefits, viz., less storage space is required, a large number of diaphragms can be handled simultaneously decreasing handling expense and minimizing the possibility of damaging the individual diaphragms, and the possibility of injury to the person handling same on the sharp stamped edges is minimized. The primary disadvantage of nesting is that there is a tendency for adjacent diaphragms to stick together due to the close match of their contours and the minute residual particles remaining on the surface of the diaphragms from the forming process. Since each metallic diaphragm must be separated from the stack in which it is nested and individually welded to another diaphragm, this tendency of diaphragms to stick together severely hinders the automation of this welding process. Various approaches have been tried to separate and dispense individual diaphragms from the nested stack, however, these approaches have proven to be unsuccessful. Because of this, it has become desirable to develop a simple, inexpensive means for individually separating and dispensing diaphragms having a wide range of diameters and thicknesses so that the welding of same can be effectively automated.

SUMMARY OF THE INVENTION

The present invention provides a simple, inexpensive solution to the aforementioned problem of diaphragms sticking to one another when in a nested configuration. To accomplish this, a section of threaded rod is inserted through the inside diameter of each diaphragm in the nested stack which is allowed to hang loosely on the rod. The rod is then rotated allowing each diaphragm to drop into a separate groove provided by the threads on the threaded rod. As the threaded rod is rotated, each diaphragm is rotated and carried upward to the free end of the rod separating it from its adjacent diaphragms and allowing the individual diaphragms to drop off the end of the rod at a rate of one diaphragm for each revolution of the rod.

BRIEF DESCRIPTION OF THE DRAWINGS

FIG. 4 is a side elevation view of the present invention showing the threaded rod in the collet and the stack of nested diaphragms on the threaded rod.

FIG. 5 is a partial cross-sectional view of a stack of diaphragms on the threaded rod and shows the non-colinearity of the axes of the diaphragms as the diaphragms move upwardly on the threaded rod.

DESCRIPTION OF THE PREFERRED EMBODIMENT

Figure 1:
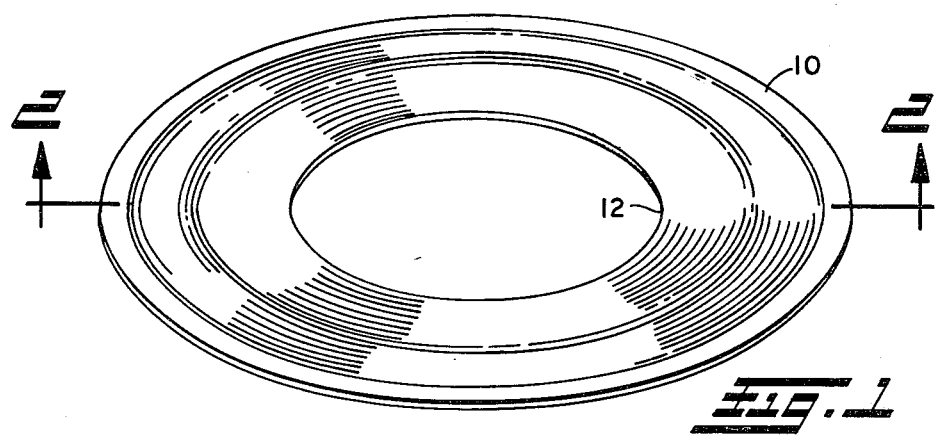
FIG. 1 is a perspective view of a typical ripple nesting diaphragm having a coned inside diameter.
Figure 2:
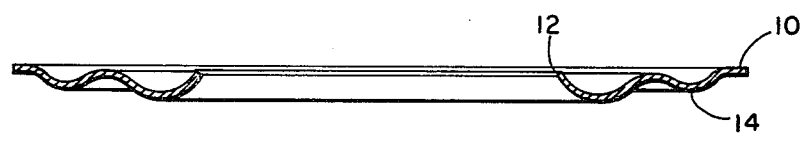
FIG. 2 is a cross-sectional view taken along section-indicating lines 2—2 of FIG. 1.
Figure 3A:
FIG. 3A is a cross-sectional view of another type of ripple nesting diaphragm.
Figure 3B:
FIG. 3B is a cross-sectional view of another type of diaphragm, viz., a ripple cantilever diaphragm.

Referring now to the drawings, FIG. 1 shows a metallic diaphragm 10 with a coned inside diameter 12. Typically, diaphragm 10 is formed from a weldable alloy, such as a stainless steel, nickel base steel, high permeability steel, or a titanium alloy. The resulting diaphragm is usually 0.002–0.010 inch thick, has an inside diameter of between 0.090–8.50 inches, and has an outside diameter of between 0.230–9.50 inches. Shallow ripples 14, as shown in FIG. 2, are provided across the surface of diaphragm 10. These ripples 14 may take many different configurations, as shown in FIGS. 3A and 3B, and allow the diaphragms to be nested, however, they also cause the diaphragms to stick together hindering the bellows welding process.

The invention of this disclosure is shown in FIG. 4 and is comprised of a section of threaded rod 16 received in a collet 18 which is driven by a gear motor 20. The longitudinal axis of the threaded rod 16 is at an angle α, which is typically between 20° to 30°, with respect to the horizontal. Gear motor 20 is adjustably mounted to a mounting plate 22 by means of adjustment screws 24 which are received through a curved elongated slot 26 in plate 22 and are operatively connected to gear motor 20. This arrangement allows the angle of the longitudinal axis of the gear motor 20 and the threaded rod 16 to be adjustable with respect to the horizontal. The resulting angle of inclination α is indicated by a pointer 28, which is attached to gear motor 20, and a scale 30 attached to mounting plate 22.

A stack of diaphragms, shown generally as numeral 32, is received on the threaded rod 16 so that the inside diameter 34 of each diaphragm in stack 32 contacts the threads on rod 16. When threaded rod 16 is rotated by gear motor 20, stack 32 of diaphragms also rotates but after several revolutions each diaphragm drops into a separate groove formed by the threads on the threaded rod 16. The direction of rotation of threaded rod 16 is such that each diaphragm 10 is rotated and carried upwardly in its own groove on threaded rod 16 to the free end of the rod where the diaphragms drop off at a rate of one diaphragm for each revolution of threaded rod 16.

The separation of the diaphragms in this manner is possible because their configuration results in nesting. If the diaphragms are stacked vertically or aligned horizontally they nest together as closely as their configuration permits. However, if they are hung loosely by their inside diameter and placed on an incline so that each diaphragm is slightly above the next lower adjacent diaphragm and is slightly below the next higher adjacent diaphragm, then their axes will not be colinear since the axis of each diaphragm is slightly above or below the axes of its adjacent diaphragms, as shown in FIG. 5. This lack of colinearity causes relative radial movement of the ripples 14 on each diaphragm 10 with respect to the ripples 14 on adjacent diaphragms. Inasmuch as the surfaces of the diaphragms are in contact with one another when in a nested configuration, this relative radial movement, particularly along the surfaces defining the ripples 14, causes the diaphragms 10 to separate, as shown in FIG. 5. It should be noted that an offset of 0.002 to 0.003 inches between the axes of adjacent diaphragms can result in a separation of 0.015 to 0.025 inches between the surfaces of adjacent diaphragms depending upon the configuration of the diaphragms, the depth of the ripples 14 on each diaphragm, the type of thread used for threaded rod 16, and the angle of inclination of the threaded rod 16 with respect to the horizontal. By selecting the proper thread pitch for the threaded rod 16, each diaphragm will be received in a single groove on rod 16, and each groove will receive a diaphragm. By varying the angle of inclination of threaded rod 16, a wide range of diaphragm configurations, diameters, and thicknesses can be accomodated with a given thread pitch.

Figure 6:
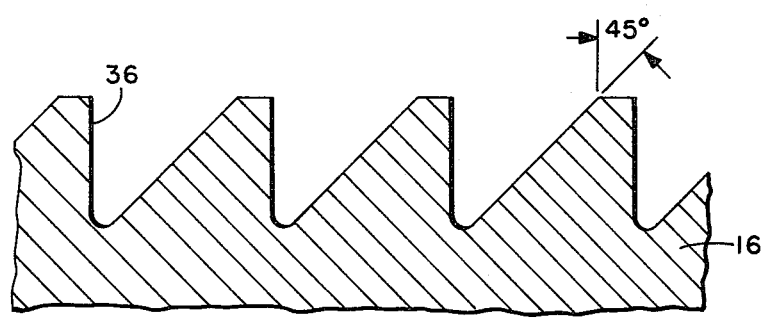
FIG. 6 is a partial cross-sectional view of the threaded rod illustrating a modified buttress type thread.

Regarding the thread shape required for threaded rod 16, any type of thread can be used, however, tests have indicated that a modified buttress thread, as shown in FIG. 6 gives consistent separation of the diaphragms. In addition, this type of thread prevents the diaphragms from jumping over threads or from falling into a lower groove as they travel up threaded rod 16. The tendency of this type of thread to separate the diaphragms and to provide for the proper upward travel of the diaphragms on the threaded rod 16 is caused by the sharp thread contour (45° for modified buttress threads versus 60° for conventional threads) and by the orientation of the trailing edge of each thread, which is perpendicular to the longitudinal axis of threaded rod 16 providing a positive engaging surface 36 for the inside diameter of each diaphragm. It should be noted, however, that even though a modified buttress thread is desirable and provides excellent results, any type of thread can be used for threaded rod 16.

Variations of the present invention will be apparent to those having ordinary skill in the art and the invention is limited only by the spirit and scope of the following claims.

I claim:

1. A device for separating thin nested objects each having a central aperture therein and one or more ripples on the surface thereof comprising means having grooves formed by threads provided thereon, said thread means being received through said apertures in said objects, and means for rotating said thread means, said thread means being oriented at an upward angle with respect to the horizontal resulting in the individual axis of each of said nested objects becoming noncolinear as said thread means is rotated causing said ripples on each of said objects to move relatively radially with respect to said ripples on adjacent objects, said relative radial movement of said ripples resulting in said objects becoming individually sufficiently separated from their nested configuration to cause said objects to be received in said grooves as said thread means is rotated.

2. The device as defined in claim 1 wherein said threads provided on said thread means are of the modified buttress type having a sharp thread contour on the leading edge substantially 45° and a trailing edge which is substantially perpendicular to said thread means.

3. The device as defined in claim 1 wherein the trailing edge of said thread means engages said aperture in each of said objects causing each of said objects to be carried upwardly to the free end of said thread means and to be individually dispensed therefrom as said thread means is rotated.

* * * * *